April 7, 1936.  F. A. SMITH  2,036,370
AUTOMOBILE LOCK STRUCTURE
Filed May 26, 1934
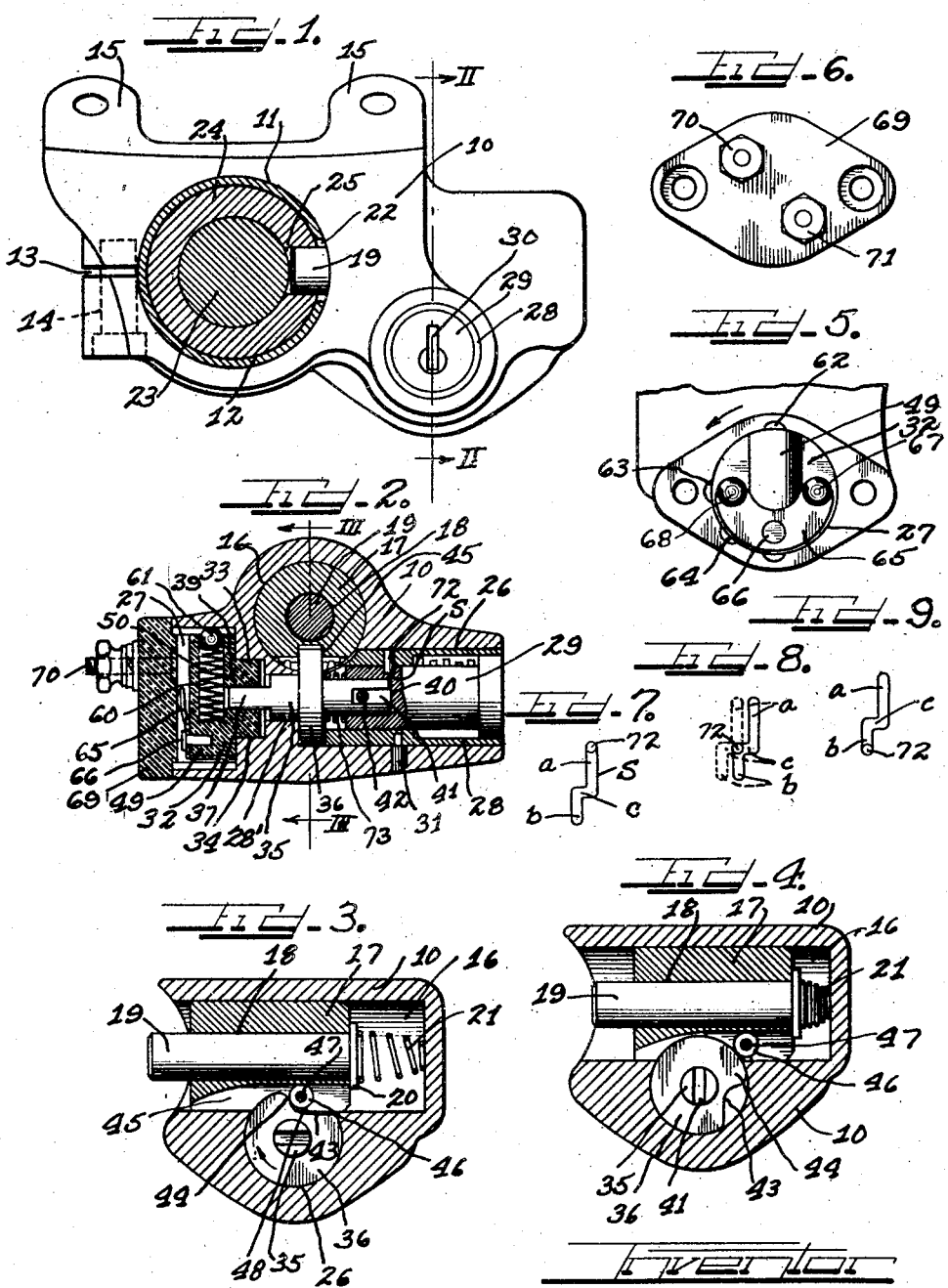
Inventor
Frederick A. Smith.
by Charles Hill
Attys.

Patented Apr. 7, 1936

2,036,370

UNITED STATES PATENT OFFICE 2,036,370

AUTOMOBILE LOCK STRUCTURE

Frederick A. Smith, North Chicago, Ill., assignor to Oakes Products Corporation, North Chicago, Ill., a corporation of Michigan Application May 26, 1934, Serial No. 727,615

7 Claims. (Cl. 200—44)

REISSUED

My invention relates to automobile lock structure and particularly to a steering and ignition lock.

An important object of the invention is to provide an improved lock structure in which a rotary lock member has such connection with a steering locking bolt and an electrical circuit switch that during one part of the rotary movement of the lock member the steering locking bolt is shifted to locking or unlocking position, and during another part of the rotary movement of the lock member the switch is operable to control a circuit.

A further object of the invention is to provide an arrangement in which a key operable lock cylinder, a movable switch element, and a steering locking bolt structure are interconnected in such manner that the steering bolt structure will be shiftable only during the fore part of the rotary movement of the lock cylinder, and the movable switch element will be effective to close the circuit only during the latter part of the rotary movement of the lock cylinder.

Another object is to provide an arrangement in which a lock cylinder, a movable switch element, and an interconnecting member are rotatable together on an axis extending transversely of the axis of the locking bolt and with a cam connection between the interconnecting member and the bolt effective only during part of the rotary movement of the lock cylinder for shifting the locking bolt to locking or unlocking position.

Still another object is to provide such arrangement of the cam connection between the interconnecting member and the locking bolt that after partial rotation of the lock cylinder and movement of the locking bolt to unlocking position, the bolt will be held in such locking position by the cam connection while the switch is operated during another part of the rotational movement of the lock cylinder.

A further object is to provide for a slight axial outward bodily shift of the lock cylinder after rotation thereof for unlocking the bolt, and an interlock between the cylinder and its stationary enclosing housing so arranged that, after turning of the lock cylinder when in its out position to close the switch, the cylinder must first be turned back to open the switch and then shifted inwardly before it can be turned for movement of the lock bolt back into steering locking position.

Another object is to produce a lock structure of the class described in which the parts are of simple construction and can be economically manufactured and assembled.

The above referred to and other features of the invention are incorporated in the structure disclosed on the drawing, in which drawing:

Figure 1 is a front view of the lock structure mounted on a steering column;

Figure 2 is a section on plane II—II Figure 1;

Figure 3 is a section on plane III—III of Figure 2 showing the steering locking bolt in locking position;

Figure 4 is a section similar to Figure 3 showing the steering locking bolt in unlocking position;

Figure 5 is a rear view showing the arrangement of the movable switch element;

Figure 6 is a plan view of the cover for the switch chamber; and

Figures 7, 8 and 9 are diagramamtic views illustrating the different positions of the lock cylinder during the manipulation of the lock structure.

The lock structure shown comprises a body 10 having a cylindrical opening 11 therethrough for receiving the steering column 12 on an automobile, the body at one side being split as indicated at 13 so that, by means of a screw 14 it may be securely clamped to the column. By means of lugs 15 the lock body may also be secured to the dash or instrument board of the automobile adjacent to which the steering column extends.

The lock body has the horizontally extending cylindrical pocket or barrel 16 opening into the passageway 11 which receives the steering column 12 and in this pocket a cylindrical plunger 17 is shiftable, this plunger forming part of the steering lock bolt structure. The plunger has the axial bore 18 extending therethrough for the lock bolt 19 which at its inner end has a head 20 between which and the closed end of the pocket a compressed spring 21 is inserted, the spring tending to hold the plunger and bolt in outer, locking position.

The steering column has the opening 22 therethrough for the lock bolt 19, and on the steering shaft 23 extending through the column is secured a bushing or sleeve 24 having the locking opening or notch 25 into which the lock bolt 19 may be projected when the steering wheel is in a certain position, usually the position at which the vehicle front wheels are straight. If the lock bolt structure is projected outwardly when the notch 25 is not in alignment with the bolt 19, the bolt will be held by the spring 21 against the outer surface of the sleeve 24 until the steering wheel is turned for reception of the lock bolt in the notch, whereafter the steering wheel will be locked against steering manipulation.

The body 10 is bored through on a line below and at right angles with the pocket 16 to provide a front cylindrical chamber 26 and a rear cylindrical chamber 27 with an intervening bearing wall 28'. The front chamber 26 receives a key operable lock structure comprising the casing 28 and a tumbler cylinder 29 rotatable therein by means of a suitable key inserted into the keyhole 30, the locking housing being secured in the chamber 26 as by means of a pin 31.

Within the chamber 27 is the movable switch element 32 in the form of a cylindrical body of insulating material with a hub 33 journalled within the recess 34 between the bearing wall 28' and the chamber 27.

Between the cylinder lock structure and the movable switch element is interposed a connecting element comprising a shaft 35 with a cam disc 36 secured thereon intermediate its ends. The rear part of the shaft is journalled in the bearing wall 28' and is flattened at its end to form a coupling tongue 37 for engaging in the coupling opening 39 in the hub 33 of the switch element so that the switch element will turn with the shaft 35.

The front end of the shaft 35 extends into the recess 40 in the rear end of the lock cylinder 29 and the shaft end has the coupling slot 41 for receiving the coupling pin 42 extending diametrally through the lock cylinder so that the shaft will turn when the lock cylinder is turned. The shaft is held against axial movement by the engagement of the cam disc 36 between the bearing wall 28' and the inner end of the lock cylinder housing 28.

The cam disc 36 is cylindrical and is cut away at one edge to leave the cam notch 43 and the abutment 44. The lock bolt structure plunger 17 has the longitudinally extending channel 45 cut therein into which the cam disc extends and a cam roller 46 is located in this channel and may be held by a bearing pin 47 suitably secured in the channel 48 in the plunger 17 and intersecting the channel 45.

Figure 3 shows the lock bolt structure in steering locking position, the spring 21 holding the structure outwardly and with the cam roller against the cam abutment 44. If the key is now turned (clockwise) the cam is turned and the engagement of its abutment 44 with the cam roller will cause the lock bolt structure to be shifted inwardly to unlocking position as shown in Figure 4, the extent of such turning movement being substantially 90°, at the end of which movement the cam roller will be in engagement with the cylindrical surface of the cam disc and the lock bolt structure will be held in this unlocking position until the lock and cam are turned in reversed direction, the cam roller then entering the cam notch and being forced outwardly to locking position by the spring 21 as the cam abutment 44 recedes.

The movable switch member 32 has a diametrally extending lug 49 which is bored to form the pocket 50 for a spring 60 which exerts pressure against a ball 61, the wall surrounding the switch chamber 27 having detent notches 62, 63 and 64 for receiving the ball, the notches 62 and 63 being spaced 90° apart and the notches 63 and 64 spaced substantially 45° apart.

On the lug 49 at the end thereof opposite to the detent ball 61 is mounted a switch blade 65 which is secured as by means of a pin 66 extending therethrough intermediate its ends, the blade being semi-circular and having at its ends contact deflections or beads 67 and 68 which, when the lock bolt structure is in locking position, are in horizontal alignment as shown in Figure 5. On the cover 69 for the switch housing are mounted contact terminals 70 and 71 for engagement by the contact beads 67 and 68, these contact terminals being in a line spaced 135° from the normal line of the contact beads 67 and 68. When the lock parts are in their normal position with the locking bolt structure in steering locking position, the spring pressed detent ball 61 is in engagement in the detent notch 62 and yieldingly holds the parts in this normal position. In this normal position the contact beads 67 and 68 are displaced 135° from the terminal contacts 70 and 71. When the lock cylinder is turned by its key 90° the cam disc 36 and the movable switch member 32 will be rotated to the same extent, the cam disc, by its engagement with the cam roller 46, causing the locking bolt structure to be shifted inwardly to its unlocking position shown in Figure 4, and the movable switch member will be rotated to a position in which its contact beads 67 and 68 are in a vertical line and still 45° away from the circuit terminals 70 and 71. During the next 45° rotation of the lock cylinder the cam element will hold the lock bolt structure against return to locking position and the movable switch element will be turned to engage its contact beads with the circuit terminals for closure of the circuit connected with said terminals, which circuit may be the ignition circuit for the automobile engine, and the steering, and the ignition circuit, are now unlocked for operation of the vehicle. By turning the lock cylinder the circuit may be turned on and off without releasing the locking bolt structure for return thereof to locking position. After the first rotational movement of the lock, that is through 90°, the spring pressed detent ball 61 will engage in the detent notch 63 and will yieldingly hold the parts in this positon. At the end of the next rotational movement, that is, the 45°, the detent ball will engage in the notch 64. Engagement of the detent ball in the various notches will increase the resistance to the turning movement of the cylinder and will also give a clicking sound so that the lock manipulator knows exactly when the ends of the turning movements have been reached.

The limit to rotary movement of the lock cylinder is defined by a pin and slot connection between the lock cylinder and its enclosing housing 28. As shown the housing has the pin 72 engaging in a slot S in the lock cylinder, the total circumferential extent of the slot being 135°. When the locking bolt structure is in locking position, one end of the slot is in engagement with the pin and after rotation of the lock cylinder to cause closure of the switch, the other end of the slot will be in engagement with the pin.

I preferably provide means independent of the detent ball 61 for automatically locking the lock cylinder against return movement after rotation thereof through 90° for shifting the locking bolt structure to unlocking position, but for permitting free rotational movement of the lock cylinder for operation of the switch through its 45° range to close or open the circuit controlled by the switch. To accomplish this, I make the slot S in two parts a and b axially offset and with the intervening connecting section c, the part a extending circumferentially 90° and the part b extending circumferentially 45°, and the part c extending substantially in axial direction. Encircling the shaft 35 between the cam disc 36 and the inner end of the lock cylinder 29 is a spring 73 exerting outward pressure against the lock cylinder. During the normal condition of the lock structure, the lock cylinder is in position for engagement of the outer end of the slot section a with the pin 72. When the lock cylinder is now turned 90° for shifting of the lock bolt structure to unlocking position, the intermediate slot section c comes into alignment with the pin 72, as indicated in dotted line in Figure 8, and then the spring 73 will shift the lock cylinder outwardly until the slot section b comes into registration with the pin, as shown by the full lines, Figure 8. In this position the lock cylinder cannot be turned back an account of the engagement of the inner end wall of the slot section b with the pin. The cylinder 10, however, may be rotated throughout the length of the slot section b, that is 45°, for operation of the switch, the switch being closed when the outer end of the slot section b reaches the pin. In order now to return the steering lock bolt structure to locking position the lock cylinder must first be turned back 45° to the position represented by full line in Figure 8, and then the lock cylinder must be pushed inwardly against the force of the spring 73 until the slot section a is brought into alignment with the pin 72 and then the lock cylinder will be free for return movement through the remaining 90° during which movement the steering lock bolt structure will be restored to locking position. With the locking arrangement described, the lock cylinder can be freely turned through its 45° range for opening or closure of the electrical circuit without danger of overturning and undesirable locking of the steering. When a vehicle is to be operated the driver turns the lock cylinder 90° to unlock the steering, at the end of which turning movement the cylinder will be automatically shifted outwardly by the spring 73 for locking of the lock cylinder and locking bolt against return movement. Thereafter the lock cylinder may be rotated through its 45° range in either direction for opening or closing of the electrical circuit.

The various parts in the lock structure are simple and can be economically manufactured and assembled, and the lock structure is durable and efficient in operation.

I have shown a practical and efficient embodiment of the various features of my invention but I do not desire to be limited to the exact construction, arrangement and operation shown and described as changes and modifications may be made without departing from the scope and spirit of the invention.

I claim as my invention:

1. In a lock structure, the combination of a housing, said housing having a longitudinal bore and a locking bolt reciprocable longitudinally therein into locking or unlocking position, said housing having a cross bore at one side of said longitudinal bore, a shaft in said cross bore, a cam connection between said shaft and said locking bolt, a lock cylinder rotatable in the front end of said cross bore and having connection with said shaft, a switch structure comprising a movable switch element in the rear end of said cross bore connected with said shaft, said cam connection being arranged to shift said locking bolt to unlocking position during only the fore part of the rotary movement of said lock cylinder, and said movable switch element being arranged to close said switch during only the latter part of the rotary movement of said lock cylinder.

2. In a lock structure, the combination of a housing having a longitudinal bore and a locking bolt reciprocable longitudinally therein to locking or unlocking position, said housing having a cross bore at one side of said longitudinal bore, a shaft journalled in said cross bore and having driving connection with said locking bolt, a lock cylinder rotatable in the front part of said cross bore, and a switch comprising a movable element in the rear part of said bore, said cylinder and switch element being connected with said shaft, said driving connection between said shaft and locking bolt being arranged to function during only the fore part of rotary movement of said locking cylinder in one direction to shift said locking bolt to unlocking position and then to hold it in such position, said switch element arranged to function to cause closure of said switch only at the end of the continued rotary movement of said lock cylinder in the same direction.

3. In a lock structure, the combination of a housing having a longitudinal extending bore and a locking bolt shiftable axially therein to locking or unlocking position, said housing having a transverse bore at one side of said longitudinal bore, a lock cylinder rotatable in the front part of said cross bore, a switch having a movable member rotatable in the rear part of said cross bore, an interconnecting member journalled in said bore for connecting said cylinder with said movable switch element and having driving connection with said locking bolt arranged to control the shifting of said bolt when said cylinder is turned, means defining axially offset paths of rotary movement of said lock cylinder, said driving connection being operated to control the shifting of said locking bolt during rotation of said lock cylinder through one of said paths and said switch element being operable to circuit closing position during rotation of said lock cylinder through its other path.

4. In a lock structure, the combination of a housing having a longitudinally extending bore and a locking bolt shiftable axially in said bore to locking or unlocking position, said housing having a cross bore at one side of said longitudinal bore, a lock cylinder rotatable in the front part of said cross bore, a switch having a movable element in the rear part of said cross bore, a shaft journalled in said cross bore and having coupling connection at its ends with said lock cylinder and said movable switch element, a connection between said shaft and locking bolt arranged to control the shifting of said locking bolt when said lock cylinder is turned, a spring pressing outwardly against said lock cylinder, pin and slot connection between said lock cylinder and housing for determining the extent of rotary movement of said cylinder, the end sections of said slot extending circumferentially and the intermediate section thereof extending substantially axially relative to said cylinder whereby to define two axially offset paths of rotation for said cylinder, said spring shifting said lock cylinder outwardly independently of said shaft when said pin and the intermediate part of said slot come into registration, said connection between said shaft and locking bolt functioning when the rotation of the cylinder is controlled by the inner end of the slot and said movable switch element functioning for control of the switch when the rotation of said lock cylinder is controlled by the outer part of said slot.

5. In a lock structure, a longitudinally shiftable locking bolt, a switch comprising a rotary element, a key operable lock cylinder, a driving connection between said lock cylinder and said locking bolt and movable switch element so arranged that rotation of said lock cylinder through only part of its rotational movement will shift the lock bolt to locking or unlocking position and during another part of its rotative movement will turn the switch on and off, means shifting said lock cylinder axially after rotation thereof in one direction to shift said bolt to unlocking position, and means for then locking said cylinder against return rotational movement.

6. In a lock structure, a longitudinally shiftable locking bolt, a switch comprising a rotary element, a key operable lock cylinder, a driving connection between said lock cylinder and said locking bolt and movable switch element so arranged that rotation of said lock cylinder through only part of its rotational movement will shift the lock bolt to locking or unlocking position and during another part of its rotative movement will turn the switch on and off, means shifting said lock cylinder axially after rotation thereof in one direction to shift said bolt to unlocking position, and means for then locking said cylinder against return rotational movement but permitting continued rotary movement thereof in the first mentioned direction for operation of said switch.

7. In a lock structure, a longitudinally shiftable locking bolt, a switch comprising a rotary element, a key operable lock cylinder, driving connection between said lock cylinder and said locking bolt and switch so arranged that rotation of said lock cylinder during only the forepart of its rotational movement will shift said lock bolt to unlocking position and during the latter part of its rotational movement will close the switch, means shifting said cylinder axially outwardly after rotational movement thereof to unlock said bolt, and means for then locking said cylinder against return rotational movement, but permitting operation of said switch.

FREDERICK A. SMITH.